United States Patent
Maurier et al.

(10) Patent No.: US 12,276,574 B2
(45) Date of Patent: Apr. 15, 2025

(54) GEL PIGGING IMPROVEMENT

(71) Applicant: Quest Integrity USA, LLC, Stafford, TX (US)

(72) Inventors: Ron Maurier, Stafford, TX (US); Robert De Lorenzo, Seattle, WA (US)

(73) Assignee: Quest Integrity USA, LLC, Stafford, TX (US)

( * ) Notice: Subject to any disclaimer, the term of this patent is extended or adjusted under 35 U.S.C. 154(b) by 204 days.

(21) Appl. No.: 17/795,834

(22) PCT Filed: Feb. 1, 2021

(86) PCT No.: PCT/US2021/016086
§ 371 (c)(1),
(2) Date: Jul. 27, 2022

(87) PCT Pub. No.: WO2021/155372
PCT Pub. Date: Aug. 5, 2021

(65) Prior Publication Data
US 2023/0070754 A1 Mar. 9, 2023

Related U.S. Application Data

(60) Provisional application No. 62/967,773, filed on Jan. 30, 2020.

(51) Int. Cl.
*G01M 3/24* (2006.01)
*F16L 101/30* (2006.01)

(52) U.S. Cl.
CPC ......... *G01M 3/246* (2013.01); *F16L 2101/30* (2013.01)

(58) Field of Classification Search
CPC ..... G01M 3/246; F16L 2101/30; F16L 55/38; G01N 29/04; G01N 29/225; G01N 29/265; G01N 2291/2636; G01N 29/28
See application file for complete search history.

(56) References Cited

U.S. PATENT DOCUMENTS

| | | | |
|---|---|---|---|
| 3,810,384 A | 5/1974 | Evans | |
| 4,434,660 A * | 3/1984 | Michaels | G01N 29/265 73/637 |
| 5,675,084 A * | 10/1997 | Goedecke | G01N 29/265 73/644 |
| 2007/0113622 A1 | 5/2007 | Buckley et al. | |
| 2008/0148856 A1 | 6/2008 | Georgeson et al. | |

(Continued)

OTHER PUBLICATIONS

Supplemental European Search in related application EP 21746959.2 dated Feb. 9, 2024.

(Continued)

*Primary Examiner* — David J Bolduc
(74) *Attorney, Agent, or Firm* — Christensen O'Connor Johnson Kindness PLLC

(57) ABSTRACT

A method for performing ultrasonic inspection to a pipe is described, comprising: introducing an in-line inspection tool assembly into a pipe, wherein the in-line inspection tool assembly comprises a gel reservoir and an ultrasonic inspection tool flanked by a pair of batching pigs, wherein the gel reservoir holds a first gel couplant; and driving the in-line inspection tool assembly along the pipe while performing ultrasonic inspection; wherein a gel slug is formed between the pair of batching pigs, and the gel slug facilitates the ultrasonic inspection.

21 Claims, 2 Drawing Sheets

(56) References Cited

U.S. PATENT DOCUMENTS

| | | | |
|---|---|---|---|
| 2009/0043205 A1 | 2/2009 | Pelissier et al. | |
| 2013/0014571 A1* | 1/2013 | Quinones | F01D 5/005 73/112.05 |
| 2018/0181136 A1* | 6/2018 | Loosararian | G01N 29/043 |
| 2019/0178853 A1* | 6/2019 | Scaccabarozzi | G01N 29/24 |
| 2021/0003532 A1* | 1/2021 | Bain | G01N 29/28 |
| 2021/0302379 A1* | 9/2021 | Jack | G01N 29/265 |

OTHER PUBLICATIONS

International Search Report and Written Opiniion in related application PCT/US2021/016086 dated Apr. 23, 2021.

* cited by examiner

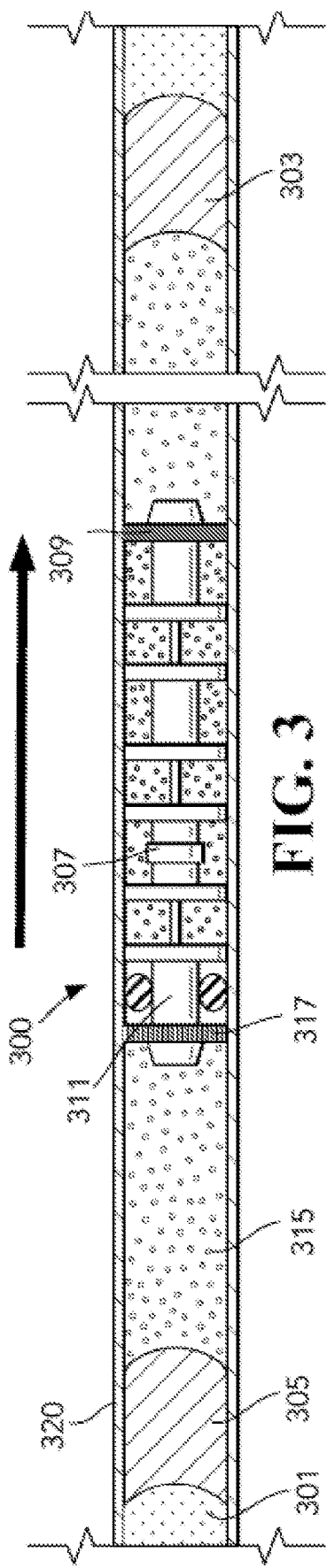
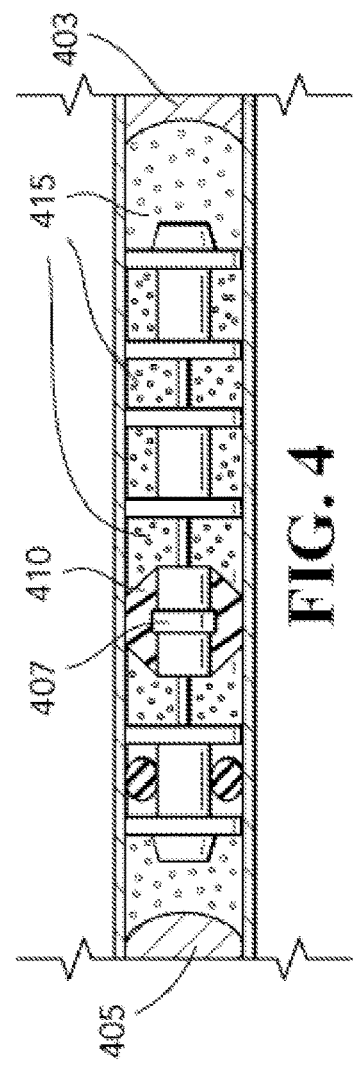

GEL PIGGING IMPROVEMENT

PRIOR RELATED APPLICATIONS

This application claims priority to U.S. Provisional Application No. 62/967,773, filed Jan. 30, 2020, which is incorporated by reference in its entirety for all purposes.

FIELD OF INVENTION

In general, the disclosure describes a system and methodology for inspecting tubes/pipes used for transporting petroleum products, such as natural gas (NG).

BACKGROUND OF INVENTION

Pigging of pipes or pipelines is performed to remove internal fouling, to inspect for defects in a pipe or to map the geographic location of the pipe. Pigging is done by pumping a device, i.e. a pig, through a pipe. Intelligent pigs have sensors that can record information on the condition of the pipe.

Presently, transport lines such as NG lines are typically inspected using Magnetic Flux Leakage technology (MFL), spot-checked using manual, external ultrasonic sensors, or inspected using conventional ultrasonic (UT) in-line-inspection (ILI) tools during static pressure testing, when the pipes or tubes are flooded with water.

MFL data only provides a qualitative measurement of the health of the pipes. It reflects the general health of the pipes, but does not provide a quantitative measurement of wall thickness or corrosion.

Spot checking only examines a very small sample of the entire pipeline. Furthermore, it requires the asset to be accessible by a person.

Static pressure testing is performed infrequently, and presents a great cost to the customer. Flooding the line with water during any other time is not desired, due to increased operational costs, and asset down-time.

Batched inspections using water have not been successful. The batching pigs were not adequate to smoothly flow through the line, which led to pressure surges on the launching and receiving ends. Furthermore, using water as a couplant left large quantities of water in the line after the inspection was completed, even with the batching pigs.

What is needed, therefore, is a more reliable method and system for inspecting a petroleum product transport lines, such as NG lines.

SUMMARY

This summary is provided to introduce a selection of concepts that are further described below in the detailed description. However, many modifications are possible without materially departing from the teachings of this disclosure. Accordingly, such modifications are intended to be included within the scope of this disclosure as defined in the claims. This summary is not intended to identify key or essential features of the claimed subject matter, nor is it intended to be used as an aid in limited the scope of the claimed subject matter.

In one aspect of this disclosure, a method for performing ultrasonic inspection to a pipe is described, comprising: introducing an in-line inspection tool assembly into a pipe, wherein the in-line inspection tool assembly comprises a gel reservoir and an ultrasonic inspection tool flanked by a pair of batching pigs, wherein the gel reservoir holds a first gel couplant; and driving the in-line inspection tool assembly along the pipe while performing ultrasonic inspection; wherein a gel slug is formed between the pair of batching pigs, and the gel slug facilitates the ultrasonic inspection.

In another aspect of this disclosure, a method for performing ultrasonic inspection of a pipe is described, comprising: introducing an in-line inspection tool assembly into the pipe, wherein the in-line inspection tool assembly comprises an ultrasonic inspection tool between a pair of batching pigs; and driving the in-line inspection tool assembly along the pipe while performing ultrasonic inspection; wherein the ultrasonic inspection tool is surrounded by a gel couplant to facilitate ultrasonic inspection, and wherein the gel couplant is semi-rigid.

In another aspect of this disclosure, an in-line inspection tool assembly for performing ultrasonic inspection of a pipe is described. The inspection tool assembly comprises a first batching pig, a second batching pig, and an ultrasonic inspection tool operatively coupled with a gel reservoir that holds a first gel couplant, wherein the ultrasonic inspection tool and the gel reservoir are located between the first batching pig and the second batching pig, and wherein a gel slug is formed around the ultrasonic inspection tool to facilitate ultrasonic inspection.

In another aspect of this disclosure, an in-line inspection tool assembly for performing ultrasonic inspection in a pipe is disclosed. The in-line inspection tool assembly comprises a first batching pig, a second batching pig, and an ultrasonic inspection tool operatively coupled between the first batching pig and the second batching pig, wherein the ultrasonic inspection tool is surround by a semi-rigid gel couplant.

BRIEF DESCRIPTION OF THE FIGURES

Certain embodiments of the disclosure will hereafter be described with reference to the accompanying drawings, wherein like reference numerals denote like elements. It is emphasized that, in accordance with standard practice in the industry, various features are not drawn to scale. In fact, the dimensions of various features may be arbitrarily increased or reduced for clarity of discussion. It should be understood, however, that the accompanying figures illustrate the various implementations described herein and are not meant to limit the scope of various technologies described herein, and:

FIG. 3 is a cross-sectional view of another embodiment of this disclosure as applied to a pipeline.

FIG. 4 is a cross-sectional view of another embodiment of this disclosure as applied to a pipe.

DETAILED DESCRIPTION

Figure 1:
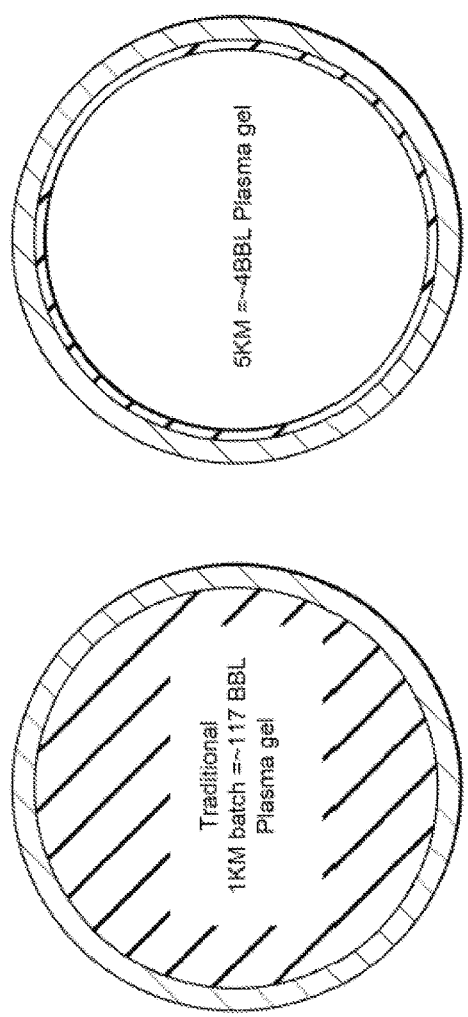
FIG. 1 is a comparison of the amount of couplant gel required between a traditional ultrasonic inspection and an embodiment of this disclosure.

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. As used herein, the terms "pipes", and "tubes" are used individually or in combination to mean the transport elements for petroleum products.

As used herein, "in-line inspection" or ILI refers to the evaluation of pipes and pipelines using non-destructive testing techniques to detect and measure any internal defect or flaw. ILI measures and records irregularities in pipelines including corrosion, cracks, deformation or other defects.

As used herein, the term "ultrasonic transducer" refers to a device that converts a pulse of electrical energy into mechanical energy in the form of sound waves. For nondestructive testing, the high-frequency sound waves are generated and received by the ultrasonic transducers, and the corresponding data is then processed to determine if any flaw exists. Typically the active element of an ultrasonic transducer is a thin disk, square or rectangle piezoelectric ceramic or composite that converts electrical energy into acoustic energy, and vice versa.

As used herein, the term "couplant" refers to a material that is capable of providing acoustic coupling between the ultrasonic transducer and a test subject. Couplant is required due to the acoustic impedance mismatch between air in the interface with the transducer and the test object. As known in the field, for ultrasonic inspection, the couplant is typically a gel, and can include a variety of different compositions. Several selection criteria may be considered: corrosion inhibition, acoustic impedance, viscosity, temperature range, and drying time or evaporation time.

Specifically, the couplant used herein should not cause any corrosion to the piping or the coating/plating of the equipment in order to avoid any failure of the part due to hydrogen embrittlement, stress corrosion cracking, or deep pitting.

Furthermore, the couplant used herein preferably reduces surface noise and improves the coupling on rough or curved metal surface. Couplants having high acoustic impedance provide improved results for concrete testing and metals of less than perfect surface conditions.

Viscosity of couplants may also affect the testing results. Couplants having higher viscosity provide enhanced coupling and reduces surface noise on curved surfaces, while exposure, adhesion to the part, and ease of application are also factors affecting couplant selection.

The operating temperature range of the couplants would also be considered. For example, temperature of the part to be tested, or length of time of inspection would impact the choice of couplant.

Drying time or evaporation time is another factor to be considered, because it affects how often the couplant needs to be re-applied, especially when performing a lengthy inspection. Petroleum product pipelines typically extend for miles and therefore couplants having longer drying time would be preferred.

As used herein, "gel reservoir" refers to a storage unit of the in-line inspection tool assembly to store additional couplant gel, such that the couplant gel can be quickly re-applied when needed. The location of the gel reservoir in the in-line inspection tool assembly can vary, as long as the actuation mechanism can introduce the additional couplant gel to the intended area.

As used herein, "pig" refers to a solid or semi-solid fluid-driven entities that are pumped through a pipeline from one point to another where launching and receiving facilities exist. "Batching pig" or "batch pig" refers to a pig with a seal in the pipeline to separate the liquid from the gas or medium in the pipeline. The batching pig used in this disclosure has a profile that conforms with the inner wall of the pipeline to minimize the amount of couplant residue after the inspection is completed.

As used herein, "gel slug" refers to a relatively short section within the pipeline that is occupied primarily by gel.

As used herein, "gel recovery device" refers to a device that recovers couplant after testing has been completed for the area. For example, a scraper disk may be included in the in-line inspection tool assembly behind the ultrasound transducer, such that once the ultrasonic transducer passes through one section of the pipe, the scrape disk can scrape the inner wall of the pipe to collect and substantially remove the couplant. In some embodiment, the scraped couplant is collected and re-supplied to the front of in-line inspection tool assembly. Other gel recovery device may be used.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The present disclosure describes a system and methodology used to inspect tubes/pipes used for transporting petroleum products, primarily natural gas (NG), using a gel-like substance. NG pipes and tubes are a common asset within the power, oil and gas industries, and routine inspection is required for properly maintaining, repairing and/or replacing the pipes. Ultrasonic inspection, while widely used, was problematic in natural gas pipeline because ultrasonic inspection tools typically requires a gel couplant surrounding the tools to obtain accurate readings, and gel couplant residue within the gas pipeline poses performance as well as safety issues. Filling the pipeline, often miles long, with gel couplant for ultrasonic inspection is time consuming and economically burdensome.

Therefore, an in-line inspection tool assembly capable of inspecting a natural gas pipeline using minimum amount of gel couplant is described. A method of inspecting the petroleum product pipeline using the in-line inspection tool assembly is also described herein.

Figure 2:
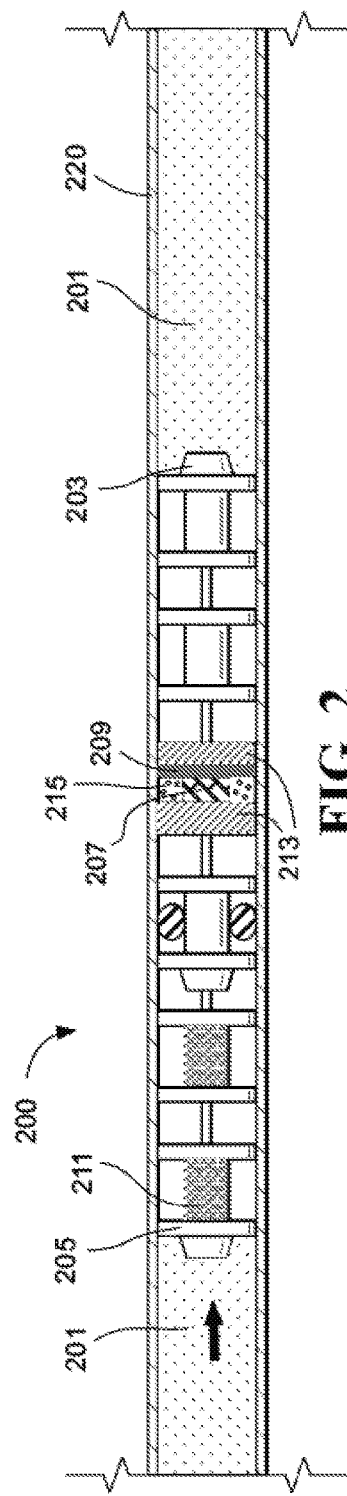
FIG. 2 is a cross-sectional view of one embodiment of this disclosure as applied to a pipeline.

Referring to FIG. 2, which shows a self-contained inline couplant (SLIC) embodiment of the present disclosure. In FIG. 2, an in-line inspection (ILI) tool assembly 200 is introduced inside a petroleum product, such as natural gas, pipeline 220. A couplant gel slug or gel train may be first introduced in the pipeline 220, after which the ILI tool assembly 200 is inserted in the gel slug. Alternatively, the gel slug may be injected from a gel reservoir 211 within the ILI tool assembly 200. In FIG. 2, the flow direction inside the pipeline 220 is toward the right, and the product, such as natural gas, 201 behind the ILI tool assembly 200 drives it downstream. The ILI tool assembly 200 comprises a first batching pig 203 at the leading end, and a second batching pig 205 at the trailing end. Both batching pigs 203, 205 provide an annular seal such that the product 201 would not leak into the space between the batching pigs 203, 205. An ultrasonic inspection tool 207 is placed between the batch pigs 203, 205.

For the ultrasonic inspection tool 207 to obtain accurate readings, a pressurized couplant plasma gel storage unit 211 is provided, along with a plasma gel extruder 209, such that a small amount of plasma gel couplant 215 is provided around the ultrasonic inspection tool 207. To reduce the amount of plasma gel used, gel containment seals 213 are provided in front and behind the ultrasonic inspection tool 207. The gel containment seals 213 provide additional annular seal to form a closed chamber encompassing the ultrasonic inspection tool 207 and prevents the plasma gel couplant 215 from escaping the chamber as the assembly 200 moves within the pipeline 220. This configuration enables ultrasonic inspection within a petroleum product pipeline 220, while reducing the amount of plasma gel couplant 215 used to an economically acceptable range.

The gel couplant 215 used will minimize residue left in the pipeline 220 because the containment seals effectively contain and carry the gel couplant 215 as the ILI tool assembly 200 moves along the pipeline 220. The gel will be used as a couplant for ultrasonic inspection of the pipeline 220, and it will not contribute any damaging effects to the pipeline 220.

In some embodiments, since pipelines 220 are periodically treated with chemicals that inhibit corrosion and other damaging effects, the plasma gel couplant 215 can also comprise the necessary chemicals for treating the pipelines 220 in addition to being used as a couplant.

Referring to FIG. 1, which shows comparison of plasma gel used between traditional method and embodiments of this disclosure for a specific set of conditions. As shown in FIG. 1, for the same set of pipeline conditions, a traditional ultrasonic inspection, required approximately 117 BBL of plasma gel per kilometer because the entire section of pipes needed to be flooded with water, and under such condition a large amount of gel couplant was required. By contrast, for that same set of conditions, using the method of the present disclosure, only 4 BBL of plasma gel would be required per 5 kilometers, which translates into a 145-fold reduction in the amount of gel required for the ultrasonic inspection.

Referring now to FIG. 3, which shows another embodiment of this disclosure. The batching pigs can be designed for each pipe to be inspected in such a way as to minimize the amount of gel-residue left in the line. As shown in FIG. 3, an in-line inspection (ILI) tool assembly 300 is introduced inside a pipeline, such as a natural gas pipeline, 320. The flow direction inside the pipeline 320 is toward the right, and the product, such as natural gas, 301 behind the ILI tool assembly 300 drives it downstream. The ILI tool assembly 300 comprises a first batch pig 303 at the leading end, and a second batch pig 305 at the trailing end. An ultrasonic inspection tool 307 is located between the batching pigs 303, 305.

Unlike FIG. 2, the ILI tool assembly 300 further comprises a plasma gel recovery scraper disk 317 to remove and recapture gel residue from the inner wall of the pipeline 320.

The batching pigs and/or the ILI tool 300 comprises gel reservoirs 311 of the gel in order to replenish any gel couplant 315 not captured by the trailing batch pig 305. The extruder 309 can inject additional gel 315 into the pipeline from the reservoir 311. The batching pigs 303, 305 and/or the ILI tool 300 may be designed in such a way as to recirculate, re-use or recapture the gel/couplant 315 that is no longer in the vicinity of the UT sensors. For example, a pump (not shown) may be included in the ILI tool assembly 300 to transfer the gel 315 collected by the scraper disk 317 to the leading end of the ILI tool assembly 300.

Referring to FIG. 4, which shows another embodiment of this disclosure. The ultrasonic portion of the ultrasonic inspect tool 407 may be encapsulated in a more rigid gel 410 in order to reduce the quantity of fluid gel 415 needed to perform the inspection. In this embodiment, semi-rigid gel 410 will encapsulate the ultrasonic inspection tool 407 and be used to transmit the ultra-sonic signal to the pipe wall, thus reducing, or possibly eliminating the need for additional couplant 415. Semi-rigid gels are less likely to be depleted or otherwise escape the space between the first and second batching pigs 403, 405.

The inspection method of the present disclosure has the advantage of using only limited amount of a gel-like couplant introduced into the pipe or pipeline in a contained manner. In this way, the gel couplant is only present in a small area of the pipe. The UT tool is then introduced into this gel, and the contained gel "slug" is propelled through the pipe or pipeline via pressure from natural gas or air.

The gel used will minimize residue left in the inspected pipe, and it will be conductive to ultrasonic signals. The gel will be used as a couplant for ultrasonic inspection of the pipe, and it will not contribute any damaging effects to the pipe. Preferably the gel has long drying time to reduce the time needed for reapplication, and a wide operating temperature range to avoid any. Currently, pipelines are periodically treated with chemicals that inhibit corrosion and other damaging effects. The gel can also be used to apply this treatment, while it is also being used as a couplant.

The quantity of gel used for each individual pipe or line will be calculated and optimized, to reduce the total quantity used as much as possible. This will be calculated as a function of the diameter of the pipe or line, the length of the pipe or line being inspected, and the amount of gel-residue left in the pipe or line after the final batching pig has passed.

The inspection method can be implemented in such a way as to minimized or eliminate leakage of the gel into any "take-off's" or other lines attached to the pipe or line currently under inspection. In the SLIC method, the ILI tool is sealed on both the leading and trailing ends to carry the couplant with it while inspecting, in order to prevent leaking. Additionally, the gel couplant may be recovered and recirculated through active and/or passive processes.

The inspection method of this disclosure enables effective and efficient inspection of petroleum assets, such as NG pipelines, using ultrasonic ILI tools, while minimizing the amount of fluid/gel/couplant required for performing the ultrasonic inspection. Furthermore, this method provides a comprehensive, quantitative measurement of the remaining asset life of the pipelines.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A method for performing ultrasonic inspection of a pipe, comprising:
   a) introducing an in-line inspection tool assembly into the pipe, wherein the in-line inspection tool assembly comprises an ultrasonic inspection tool that is flanked by a pair of batching pigs comprising a first batching pig and a second batching pig, wherein at least one of the first and second batching pigs includes a gel reservoir for storing a first gel couplant, and wherein the gel reservoir holds the first gel couplant; and
   b) driving the in-line inspection tool assembly along the pipe while performing ultrasonic inspection;
   wherein a gel slug is formed between the pair of batching pigs, and said gel slug facilitates the ultrasonic inspection.

2. The method of claim 1, wherein the gel slug is formed by releasing the gel from the gel reservoir into the pipe between the pair of batching pigs.

3. The method of claim 1, wherein the in-line inspection tool assembly further comprises seals adjacent to the ultrasonic inspection tool to form a closed chamber encompassing the ultrasonic inspection tool.

4. The method of claim 3, wherein the gel slug is formed within the closed chamber.

5. The method of claim 1, wherein the gel serves as couplant for ultrasonic inspection.

6. The method of claim 1, wherein the in-line inspection tool assembly further comprising a gel recovery device to collect and recycle the gel.

7. The method of claim 6, wherein the gel recovery device comprises a scraper disk.

8. The method of claim 6, wherein the gel recovery device recovers gel after the ultrasonic inspection tool passes, and the recovered gel is re-supplied in front of the ultrasonic inspection tool.

9. The method of claim 1, further comprising, prior to step (a):
   introducing a first gel couplant into the pipe.

10. The method of claim 1, wherein the ultrasonic inspection tool is further surrounded by a second gel couplant, wherein the second gel couplant has a different composition than the first gel couplant.

11. The method of claim 10, wherein the second gel couplant is semi-rigid.

12. The method of claim 1, further comprising: supplying the first gel couplant between the first and the second batching pigs from the gel reservoir.

13. A method for performing ultrasonic inspection of a pipe, comprising:
   a) introducing an in-line inspection tool assembly into the pipe, wherein the in-line inspection tool assembly comprises an ultrasonic inspection tool between a pair of batching pigs; and
   b) driving the in-line inspection tool assembly along the pipe while performing ultrasonic inspection;
   wherein the ultrasonic inspection tool is surrounded by a gel couplant for ultrasonic inspection, and wherein the gel couplant is a semi-rigid gel couplant that is surrounded by a fluid gel couplant in a first direction of moving the ultrasonic inspection tool and in a second direction opposite from the direction of moving the ultrasonic inspection tool.

14. An in-line inspection tool assembly for performing ultrasonic inspection in a pipe, said in-line inspection tool assembly comprises a first batching pig, a second batching pig, and an ultrasonic inspection tool, wherein at least one of the first and second batching pigs comprises a gel reservoir that holds a first gel couplant and wherein a gel slug is formed around the ultrasonic inspection tool to facilitate ultrasonic inspection.

15. The inspection tool assembly of claim 14, further comprising a first seal and a second seal, wherein the first and second seals flank the ultrasonic inspection tool to form a closed chamber encompassing the ultrasonic inspection tool.

16. The inspection tool assembly of claim 15, wherein the gel slug is formed within the closed chamber.

17. The inspection tool assembly of claim 14, further comprising a gel recovery device between the first and the second batching pigs, wherein said gel recovery device recovers gel couplant after the ultrasonic inspection passes.

18. The inspection tool assembly of claim 17, wherein the recovered gel is re-supplied in front of the ultrasonic inspection tool.

19. The inspection tool assembly of claim 14, further comprising a second gel couplant surrounding the ultrasonic inspection tool, wherein the second gel couplant has a different composition than the first gel couplant.

20. The inspection tool assembly of claim 14, wherein the ultrasonic inspection tool is surround by a semi-rigid gel couplant.

21. The method of claim 1, wherein the in-line inspection tool assembly further comprises a plasma gel extruder configured for providing the first gel couplant around the ultrasonic inspection tool.

* * * * *